Patented Nov. 14, 1933

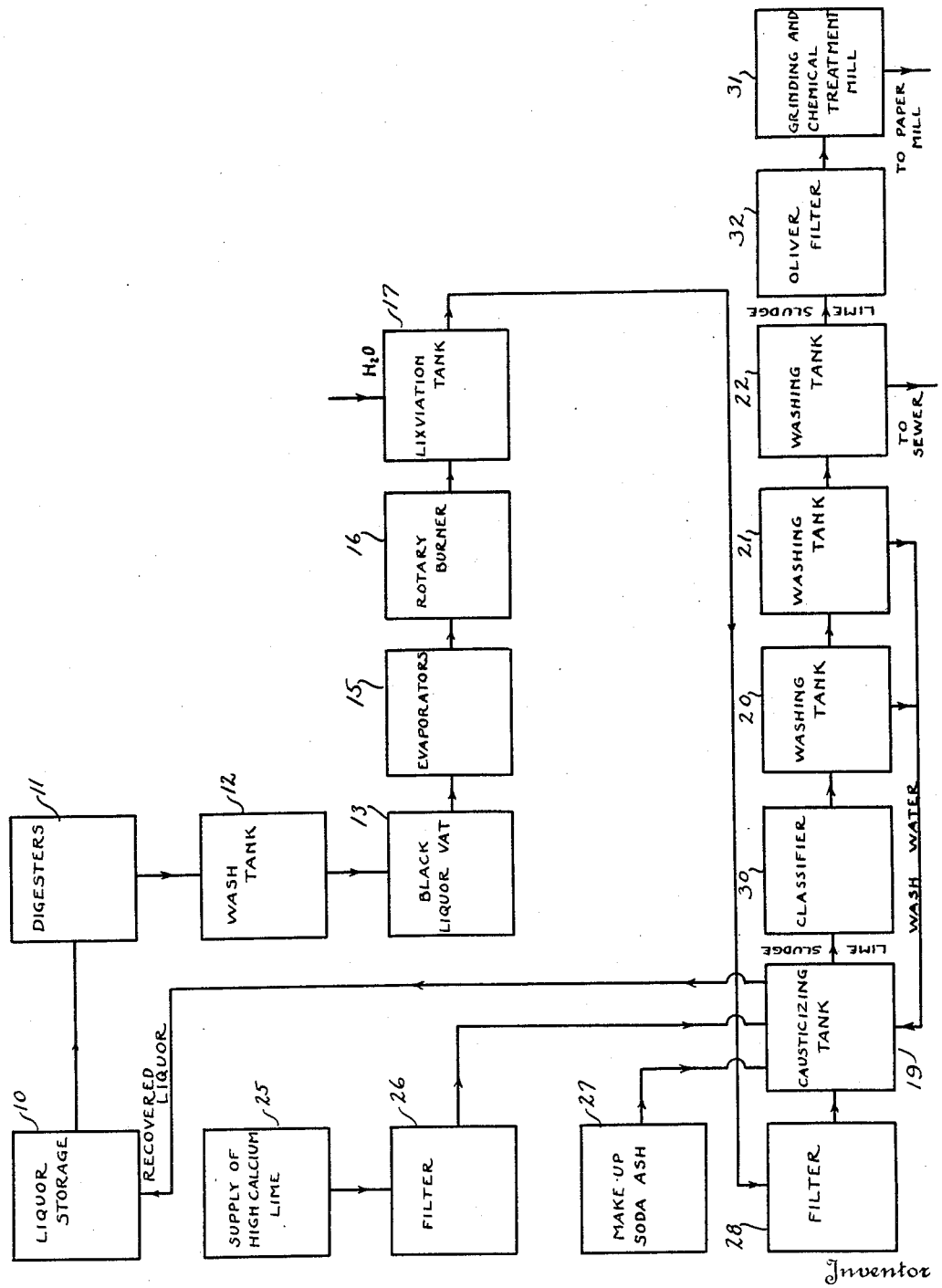

1,935,482

UNITED STATES PATENT OFFICE 1,935,482

PAPER MANUFACTURE

James J. O'Connor and Donald F. Morris, Chillicothe, Ohio, assignors, by mesne assignments, to The Mead Corporation, Dayton, Ohio, a corporation of Ohio Application February 4, 1929. Serial No. 337,302

16 Claims. (Cl. 92—21)

This invention relates to the manufacture of paper, and particularly to the better grades of printing paper, such as book paper.

One of the principal objects of this invention is to provide a paper of this character which has an unusually economical furnish and has at the same time superior characteristics such as printing quality and opacity.

Another object of this invention is to provide a body filler for paper which is quite cheap and has very desirable properties.

Still another object of this invention is to provide a method in the manufacture of paper using such a body filler to give highly effective results in commercial operation and to produce the above product.

Other objects and advantages of the invention will be apparent from the following description, the appended claims and the accompanying drawing.

In the drawing, the single figure is a diagrammatic view of apparatus adapted for carrying out the method of this invention and for producing the above product, but inasmuch as conventional forms of mechanism are used illustration of the construction thereof is not necessary.

Referring to the drawing, a tank for the storage of fresh caustic soda liquor, which may be used for a soda cook, for example, is indicated at 10. This liquor is supplied to the digester 11 together with a charge of raw fibrous material to be cooked. At the completion of the cook the digester is blown, the resulting pulp and liquor being discharged into a blow pit and wash tank 12. Here the liquor is drained and washed from the pulp, this "black liquor" being collected in a suitable vat 13. Controlled quantities of the black liquor are passed to recovery to be again converted to sodium hydroxide to supply cooking liquor for fresh batches of raw fibrous material. This is effected by passing black liquor to evaporators indicated at 15 where the liquor is concentrated to a thick syrup. The concentrated syrup is then burned to dryness in a rotary burner 16, the carbon in the material serving as fuel for the burning. This converts the sodium compounds present primarily into sodium carbonate. The resulting dry product, which consists principally of sodium salts and free carbon particles, is then lixivated with water in a tank 17 to effect solution of the sodium compounds. This solution is then removed by decantation from the insoluble black ash. The solution thus decanted is passed to the causticizing tank 19 where it is mixed with a proportionate quantity of lime and the following reaction takes place:

$$Na_2CO_3 + CaO + H_2O \rightarrow 2NaOH + CaCO_3$$

The sodium salt present is thus reconverted to sodium hydroxide, and a precipitate of calcium carbonate is formed which settles to the bottom of the causticizing tank. The liquor is removed from the precipitate by decantation and is passed with additional makeup liquor to the storage tank 10 where it is ready for use for further cooking. The precipitate, which is called "lime sludge", consists principally of calcium carbonate, with a small quantity of calcium hydroxide present due to excess lime used in causticizing, and small quantities of other compounds including compounds of magnesium and silicon as impurities. This precipitate is passed through a series of washing tanks indicated at 20, 21 and 22 where it is given successive washings with wash water to remove retained alkali. The wash water from the first and second wash tanks 20 and 21 is generally added to the liquor which is introduced into the causticizing tank so that this more concentrated alkaline liquor is not wasted. The wash water from the last tank of the series, which is more dilute, is generally discharged to sewer.

In the conventional practice that has heretofore existed in the paper industry, the washed lime sludge has been discarded as a waste product. We have discovered that this material with proper treatment and processing provides a very satisfactory body filler for paper. A paper filled with lime sludge in accordance with our invention possesses superior characteristics to the paper formed from the same quality of fibrous furnish using the conventional clay as filler, having improved printing quality and opacity. It is comparable in characteristics to a paper filled with a specially prepared precipitate of finely divided calcium carbonate and magnesium hydroxide, such a filler being described in the patent to Harold R. Rafsky, No. 1,374,112, dated April 5, 1921, and known commercially as "raffold". Such a specially prepared filler is quite expensive, as likewise are the conventional English clay fillers. The filler of our invention is a plentiful waste product and is at present available at ten to twenty times less cost than the conventional clay fillers.

In accordance with our invention, the quality of the lime sludge precipitate and the resulting filler is improved by mixing the lime in the supply chest 25 with water to form a suspension which is screened in the coarse filter 26 to remove lumps before the lime is used for causticizing, to thereby grade the size of the precipitate in the lime sludge. High calcium lime is preferably used in order to get quick settling in the causticizing tank 19. The lixiviated black ash solution coming from the lixiviating tank 17 is filtered by a suitable filter 28 to remove carbonized residue before this solution is introduced into the causticizing tank, so that the precipitate is not contaminated with black carbon particles. Any conventional type of filter may be used for this purpose, a cloth filter being quite satisfactory. The filtered black ash solution then passes to the causticizing tank 19 where it is mixed with the lime suspension from the filter 26, additional soda ash being admitted from the makeup chest 27 as needed to provide for a balanced supply of lime and soda ash.

The suspension of lime sludge from the causticizing tank 19 is flowed or pumped to a settling and filtering tank 30, where any sand and grit are permitted to settle out of the suspension and are removed therefrom, and where lumps are filtered from the suspension. Any suitable type of settling and filtering mechanism may be used, such as that known as a classifier. This generally comprises a settling box in the form of an inclined trough open at the upper end. The suspension is supplied to the trough, and the sand and grit or other impurities settling to the bottom are removed by rakes on a chain conveyor which drag the removed impurities out of the liquid at the open end which is above the normal liquid level. A screen filter overflow is provided at the other end of the inclined trough, and the suspension overflowing at this end passes through the filter which removes lumps.

The lime sludge suspension from the classifier then passes to washing tanks 20, 21 and 22, where the free sodium carbonate remaining in the suspension is washed out and recovered. The sludge then passes in a rather dilute suspension to a filter, such as a rotary vacuum filter or Oliver filter 32, where the sludge is further washed and concentrated into a relatively thick suspension suitable for subsequent treatment. The lime sludge suspension is then passed through a grinding and chemical treatment mill 31, which serves to reduce the size of the particles, and otherwise change the physical and chemical characteristics of the sludge to give improved formation, opacity, color and printing qualities to the ultimate paper sheet. Any suitable colloidal mill or pebble mill may be used for this purpose. A rod mill in which the interior of the casing and the rods are composed of a rust-proof material which does not impart discoloration to the filler gives a filler of exceptionally good characteristics. Very satisfactory results are secured by grinding the suspension at about 50% consistency, although this may be varied within wide limits. A suspension improving material, such as gum arabic, alum and dolemitic lime, starch, and other chemicals imparting colloidal characteristics to the suspension, may be added so that the grinding is carried out in the presence of such material, to give a better colloidal suspension. Thus satisfactory results have been secured by the addition of ¼% to ½% by weight of a mixture of papermaker's alum and dolemitic lime, giving a colloidal precipitate of aluminum hydroxide in the suspension.

In some instances, still further improvement in the color of the sheet results when the free alkali in the lime sludge, that is the free calcium hydroxide which is present due to the excess of lime used for causticizing, is first neutralized before the sludge is added to the furnish. This may be conveniently effected during the grinding operation, where a calculated amount of acid, such as sulfuric acid, is added to the suspension. The agitation in the grinding mill 31 effectively mixes the chemical and sludge and secures the desired neutralizing action. This neutralizing treatment is also found to effect economy in the use of alum, where such is used in the furnish. Other chemicals of a reducing nature may be added to the lime sludge in certain instances to give further improvement in color. Thus the addition of about ¼% to ½% by weight of sodium hydrosulfite, sodium sulfide, or a similar reducing chemical during the grinding operation gives very satisfactory results.

Lime sludge filler may be added to the furnish in the conventional manner in which filler is generally added, that is, the filler may be added at the beater. Or the lime sludge may be added at other points in the cycle between the beater and the forming machine, provided adequate intermingling with the other ingredients of the furnish is secured. As an example of a suitable furnish prepared in accordance with this invention and adapted particularly for the manufacture of magazine grades of printing paper, the following is mentioned: sulfite pulp 20 to 25%; old paper stock and broke 20%; and soda pulp 55 to 60%. To about 2200 pounds (air dry basis) of this pulp is added about 300 to 600 pounds of lime sludge. In general about 15% to 30% by weight of lime sludge on the dry weight of the pulp is satisfactory for this grade of paper. Or a proportion of lime sludge filler may be used with a proportion of another filler, such as raffold, in the furnish to impart desired characteristics to the sheet. A small amount of a coloring material, such as ultramarine or color lakes, is preferably added to the furnish to improve the color of the paper. In this case, a small quantity of mordant, such as aluminum sulfate is also added, which is found to effect improved retention of the coloring material in the stock to give a better color to the final product.

Where an acid reacting mordant, such as aluminum sulfate, is used in the furnish, it is found that such a mordant reacts with a carbonate filler of this character, and where considerable quantities of these materials are added in the beater and a long reaction time is permitted before the furnish is supplied to the paper making machine, objectionable gas bubbles are produced from the reaction which are retained in the fibrous stock and show up objectionably in the finished sheet. By delaying the introduction of the alum or carbonate filler in objectionable amounts into the stock until only a few minutes before the stock is formed on the paper making machine, these objectionable gas bubbles are not produced. Thus either the carbonate filler or the alum may be introduced at the beaters and the introduction of the other material delayed until shortly before formation of the sheet. Or both the alum and the carbonate filler may be introduced into the continuously flowing stream of stock at a point shortly before it passes onto the forming wire of the paper making machine, but so that a homogeneous stock is supplied to the wire. Where the filler is added continuously to the continuously flowing stream of stock, it is preferably made down into a rather dilute suspension in water, which admits of accurate control in its introduction such as by being pumped through a pipe controlled by a suitable valve. Satisfactory results are secured with a suspension containing about three pounds of lime sludge to the gallon, although this may be varied to suit operating conditions.

While the precipitate resulting from the causticization of lixiviated black ash in the soda recovery process of the paper making industry has been specifically described herein, other precipitates of calcium carbonate resulting from a similar causticizing operation may be used, such as the lime sludge precipitate formed in the causticizing operation in the manufacture of soap, and which is also a waste product. The present invention is particularly advantageous for a mill making soda pulp and manufacturing a sheet containing about 30% or more of soda pulp, as in such case a sufficient and continuous supply of lime sludge is produced during the paper manufacture from the recovery process of the soda pulp cooking liquor. However lime sludge forms a very satisfactory filler for other types of furnish, such as sulfite and kraft pulp, and it may be used generally as a body filler for paper wherever an available supply of the by-product is found, whether from a causticizing operation in the soda recovery process or from other sources.

While the forms of invention herein described constitute preferred embodiments thereof, it is to be understood that the invention is not limited to these precise forms and that variations may be made therein without departing from the scope of the invention which is defined in the appended claims.

What is claimed is:

1. In the manufacture of paper using as a body filler a lime sludge precipitate, the method which comprises grinding the lime sludge precipitate in a relatively thick suspension in water, then diluting the ground suspension and then adding the diluted suspension to a fibrous furnish to provide a paper forming stock.

2. For use in the manufacture of paper wherein a filler is mixed with a fibrous furnish and the admixed materials formed into paper with the filler distributed throughout the body of the paper, a body filler comprising a suspension of a lime sludge precipitate in water containing a suspension improving material.

3. As a product of manufacture, a paper comprising a sheet formed from a fibrous furnish containing more than 30% by weight of soda pulp, and having a high calcium lime sludge filler distributed throughout the body of the sheet, the lime sludge filler being obtained in the recovery of liquor used in the cooking of the soda pulp.

4. As a product of manufacture, an unsized paper comprising a sheet formed from an unsized fibrous furnish, a high calcium lime sludge filler distributed throughout the body of the sheet, a coloring material, and a mordant such as alum.

5. In the manufacture of paper in which a processed lime sludge is used as a filler for the paper, the method which comprises grinding the lime sludge in suspension in water in the presence of an acid reacting chemical, and mixing the ground lime sludge with paper forming stock.

6. In the manufacture of paper in which a processed lime sludge is used as a filler for the paper, the method which comprises grinding the lime sludge in suspension in water in the presenec of alum and mixing the ground lime sludge with paper forming stock.

7. A printing paper, such as a book paper, comprising an unsized sheet of fibrous furnish having a processed lime sludge filler obtained from the recovery of pulp cooking liquor incorporated in the body of the sheet.

8. A printing paper, such as a book paper, comprising a sheet of fibrous furnish containing in excess of 30% by weight of the fibrous furnish of soda pulp and also containing sulfite pulp, said sheet having a finely divided slow settling high calcium lime sludge filler obtained from the recovery of cooking liquor used in the cooking of the soda pulp incorporated in the body of the sheet.

9. A printing paper, such as a book paper, comprising a sheet of fibrous furnish containing in excess of 30% by weight of the fibrous furnish of soda pulp and also containing sulfite pulp and old paper stock, said sheet having in excess of 15% by weight on the dry weight of the pulp of processed high calcium lime sludge filler incorporated in the body of the sheet.

10. In the manufacture of paper, such as printing paper suitable for magazines, in which a lime sludge filler is used as a body filler for the paper, which lime sludge filler is obtained from the causticizing operation of lixiviated recovered soda ash in the recovery of alkaline cooking liquor from an alkaline pulp mill, the method which comprises filtering directly the lixiviated recovered soda ash solution, causticizing the filtered solution with lime, removing the causticized liquor from the resulting lime sludge precipitate, washing and screening the lime sludge precipitate, and mixing the washed and screened lime sludge precipitate with paper forming stock.

11. In the manufacture of paper, such as printing paper suitable for magazines, in which a lime sludge filler is used as a body filler for the paper, which lime sludge filler is obtained from the causticizing operation of lixiviated recovered soda ash in the recovery of alkaline cooking liquor from an alkaline pulp mill, the method which comprises screening the lixiviated recovered soda ash solution, forming a water suspension of quick lime, screening the lime suspension, adding the screened soda ash solution to the screened lime suspension, removing the causticized liquor from the resulting lime sludge precipitate, washing and screening the lime sludge precipitate, and mixing the washed and screened lime sludge precipitate with paper forming stock.

12. In the manufacture of paper, in which a processed lime sludge is used as a filler for the paper, the method which comprises grinding the lime sludge in a flowable suspension in water, and mixing the ground lime sludge with a fibrous furnish to provide a paper forming stock.

13. In the manufacture of paper, in which a processed lime sludge is used as a filler for the paper, the method which comprises subjecting the lime sludge in suspension in a liquid to treatment with a plurality of elongated parallelly arranged impacting elements which freely roll and tumble over each other in intermingled contact with the lime sludge, and mixing the treated lime sludge with a fibrous furnish to provide a paper forming stock.

14. In the manufacture of paper, in which a processed lime sludge is used as a filler for the paper, the method which comprises neutralizing free alkali in the lime sludge by mixing in the presenec of water with an acid-reacting non-gaseous chemical other than a carbonate, grinding the lime sludge, and mixing the ground lime sludge with a fibrous furnish to provide a paper forming stock.

15. For use in the manufacture of paper wherein a filler is mixed with a fibrous furnish and the admixed materials formed into paper with the filler distributed throughout the body of the paper, a body filler comprising a finely divided slow settling non-furnaced and uncarbonated lime sludge precipitate obtained in the recovery of pulp cooking liquor by causticization with high calcium lime.

16. As a product of manufacture, a paper formed from a mixture of a fibrous furnish and a finely divided slow settling lime sludge body filler obtained in the recovery of pulp cooking liquor by causticization with high calcium lime, and containing the lime sludge filler distributed throughout the body of the sheet.

JAMES J. O'CONNOR.
DONALD F. MORRIS.